United States Patent Office 3,840,505
Patented Oct. 8, 1974

3,840,505
METAL-CONTAINING, ORGANIC HIGH MOLECULAR COMPOUND REINFORCED WITH PARTICULATE INORGANIC MATERIAL
Hiroshi Sato, Koji Takahashi, Sadaaki Shigeta, and Yoshitaka Abe, Ohtake, Japan, assignors to Mitsubishi Rayon Co., Ltd., Tokyo, Japan
No Drawing. Filed Dec. 23, 1971, Ser. No. 211,661
Claims priority, application Japan, Dec. 24, 1970, 45/117,283
Int. Cl. C08f *15/36, 15/38, 45/16*
U.S. Cl. 260—85.5 S                    7 Claims

ABSTRACT OF THE DISCLOSURE

A metal-containing, organic high molecular weight compound which is superior in heat resistance, structural stability and processability, is provided by coordination bonding a copolymer of acrylonitrile or methacrylonitrile or mixtures thereof with an unsaturated carboxylic compound, through the nitrile group, with at least one metallic compound wherein the metal of said compound is a metal of the 4th Period or Group II of the Periodic Table. In one embodiment, an inorganic filler is dispersed throughout said compound.

BACKGROUND OF THE INVENTION

Field of the Invention

This invention relates generally to coordination bonded metal compounds containing acrylonitrile and/or methacrylonitrile copolymers. More particularly, this invention relates to a coordination bonded metal compound containing acrylonitrile and/or methacrylonitrile copolymers wherein the metal compound is coordination bonded through the nitrile units of said copolymer. Optionally, at least one particulate or fibrous filler is dispersed throughout said compound.

Description of the Prior Art

It is known that the properties of organic high molecular weight compounds can be varied by bonding metals to the molecule. Such materials have found a wide range of industrial acceptability, particularly as molding, structural and industrial materials. Bonding of the metal to the organic compound is attained by the formation of ionic or coordination bonds.

In ionic bonding, the metals are typically ionically bonded to an ionic group in the high molecular weight compound, typically a carboxylic acid group. Such ionically bonded compounds are characterized, in the solid state, by a high degree of impact resistance, a good rubber elasticity and good flexibility, as comparable to conventional cross-linked polymeric compounds. The ionically bonded, metal containing organic high molecular weight compounds, however, tend to lose their structural stability when placed into polar solvents, such as water or alcohol, or in an atmosphere of the polar solvents, particularly at high temperatures. These compounds also demonstrate the deleterious effects that they tend to lose their structural stability when subjected to shearing stresses at high temperatures, which tend to break the ionic bonds and create unacceptably high fluidity.

Coordination bonded, metal containing high molecular weight compounds are considerably superior to the corresponding ionically bonded compounds insofar as such characteristics as heat resistance and structural stability and the like are concerned, particularly when subjected to the action of polar solvents. In view of these desirable properties, it has been proposed to prepare metal coordination compounds of nitrile group containing vinyl polymers, wherein the coordination bonding is through the nitrile groups. These compounds are relatively easy to obtain in the form of relatively high molecular weight compounds, as compared with conventional, coordination bonded, metal containing organic high molecular weight compounds, and could be expected to find specific utility as structural materials of excellent thermal and mechanical properties. However, nitrile group containing vinyl polymers, such as polyacrylonitrile will thermally or oxidatively decompose when exposed to temperatures of above 250° C. When atoms or ions of metals, particularly those of the transition metals, are present in the polyacrylonitrile, the rate of oxidative decomposition is accelerated, and in some instances can begin to occur at temperatures as low as about 180° C. Coordination bonding of the metal compound with the acrylonitrile polymer had to be effected under relatively mild conditions.

The softening point of polyacrylonitrile is about 300° C. and it will thermally decompose, oxidatively decompose and change color when heated to that temperature, so that it is difficult to successfully mold. This has also severely hindered the full acceptance of metal containing acrylonitrile polymers for use as structural materials.

A need exists, therefore, for a metal containing organic high molecular weight compound which possesses good mechanical properties including good heat resistance, high modulus of elasticity, high tensile strength and good flexural strength.

SUMMARY OF THE INVENTION

Accordingly, it is one object of this invention to provide a basic-metal containing organic high molecular weight compound which is characterized by excellent structural stability at high temperatures, and by good processability.

Another object of this invention is to provide a process for preparing these novel compounds.

These and other objects, as will hereinafter become more readily apparent, can be attained by the provision of a metal-containing polymeric compound comprising a copolymer prepared by copolymerizing acrylonitrile or methacrylonitrile or a mixture thereof with an unsaturated carboxylic compound, which copolymer is coordination bonded through its nitrile groups to at least one metallic compound of a transition metal of the 4th Period, or a metal of Group II of the Periodic Table, and further to a process for preparing the same. More particularly, these objects have been attained by the provision of an organic high molecular compound which comprises a copolymer of 45–97% by weight of acrylonitrile and/or methacrylonitrile with 4–55% by weight of an unsaturated carboxylic acid and/or its ester and/or amide; at least one compound of a transition metal of the 4th Period of the Periodic Table or a Group II metal which is coordination bonded to the copolymer through the nitrile groups, in the form of an anion or salt and in a molar ratio of from 32:1 to 32:32; and, optionally, at least one particular or fibrous filler, such as powdered silica, aluminum or copper, or asbestos fibers, in amounts of 5–1800% by weight of the copolymer.

DETAILED DESCRIPTION OF THE INVENTION

The process for preparing the compounds of this invention comprises the steps of (1) dispersing or dissolving in water or a polar solvent about 45–97% by weight of acrylonitrile and/or methacrylonitrile and about 55–3% by weight of an unsaturated carboxylic acid and/or its ester and/or amide, (2) polymerizing the suspension, emulsion or solution using a free radical polymerization initiator at temperatures of from 5° C. to 90° C. to produce a copolymer containing 45–97% by weight of the nitrile compound and 3–55% by weight of the unsaturated carboxylic compound. Alternatively, this compound can be prepared by (1') dispersing or dissolving about 45–97 parts by weight of acrylonitrile or methacrylonitrile and about 55–3 parts by weight of an unsaturated carboxylic compound in a sol of 1–1800 parts of a powdered inorganic material, such as powdered silicon dioxide, in water or a polar solvent, the inorganic material forms a colloid in the sol, (2') suspension or emulsion polymerizing the mixture using a free radical polymerization initiator at temperatures of from 5° to 90° C. to produce a copolymer containing 45–97 parts by weight of the nitrile compound and 3–55 parts by weight of the unsaturated carboxylic compound and having the powdered inorganic material uniformly dispersed therein. In either instance, the copolymer may further have incorporated therein a particulate filler, such as powdered aluminum or copper, or a fibrous filler, such as asbestos fibers. The thus-produced copolymer is then reacted (3) with at least one metal compound of a 4th Period transition metal or a Group II metal in a molar ratio of from 1:32 to 32:32 metal compound to nitrile groups of the copolymer, while heating at a temperature of 150°–250° C. either during or after compression molding at a pressure of at least 50 kg./cm.². An alternative method is to react the copolymer with the metallic compound at a temperature of 40°–140° C. in a solution of a common solvent, or in suspension using a solvent for the metallic compound, removing the solvent from the reaction mixture to obtain a solid residue and then molding the residue to obtain a heat-resistant, metal-containing, organic high molecular compound wherein the nitrile groups are coordination bonded with the metallic ion or metallic compound in a molar ratio of from 32:1 to 32:32.

Suitable metallic compounds useable for these processes include the chlorides, carbonates, borates, acetates, sulphates, nitrates, or acetylacetonates of iron, cobalt, nickel, manganese or copper, as the transition metals, or of zinc, etc., as the Group II metals.

The metal-containing, organic high molecular compounds of this invention, in which the nitrile groups are coordination bonded with the ions or salts of said metals, have an increased structural stability at high temperatures, an increased elasticity and a decreased thermal expansibility owing to the formation of coordination bond type cross-linking structures in the molecule. If these compounds further contain a powdered inorganic material, they will be provided with very desirable properties as a reinforced polymeric material.

Suitable copolymers which may be used for the production of the metal-containing polymeric compound according to this invention are those which contain acrylonitrile or methacrylonitrile in amounts of 45–97% by weight. If the copolymer contains less than 45% by weight nitrile compounds, the product will not have satisfactory heat resistance when coordination bonded with said specific metallic compounds.

The unsaturated carboxylic compounds used in the formation of the copolymer may be a carboxylic acid, ester or amide.

Suitable unsaturated carboxylic esters include alkyl esters of acrylic, methacrylic, itaconic, fumaric, crotonic and maleic acids, wherein the alkyl group contains from 1–8 carbon atoms and is preferably methyl, ethyl, n-butyl or i-butyl. Suitable unsaturated carboxylic amides which may be used include acrylamide, methacrylamide, N-methylol acrylamide, N-methylol methacrylamide, N-diacetone acrylamide. Suitable unsaturated carboxylic acids which may be used include the acids of acrylic, methacrylic, itaconic, fumaric, crotonic, and maleic acids.

The copolymers prepared with the unsaturated carboxylic compounds and the acrylonitrile and/or methacrylonitrile are inhibited from thermal and oxidative decomposition and have low softening points, which enhance their moldability, as compared with polyacrylonitrile or polymethacrylonitrile.

It has been found that the extent of enhanced properties can be varied by the quantity of unsaturated carboxylic compound used, within the above-mentioned limits.

More particularly, if the copolymer contains the unsaturated carboxylic ester as one of the copolymerized components, it will significantly inhibit thermal and oxidative decomposition, as compared with polyacrylonitrile, so that it is relatively easy to select suitable conditions for a complex-forming reaction of the nitrile groups of the copolymers with the metallic compound. The resulting metal-containing polymeric compounds will thus be superior in fluidity and processability, such as moldability, because the copolymers have lower softening points. If the copolymers contain too much unsaturated carboxylic compounds, however, the structural stability at high temperatures can be impaired.

If the copolymers contain an unsaturated carboxylic amide as one of the copolymerized components, the resulting metal-containing, organic high molecular compounds will be superior in such mechanical properties as tensile strength, impact strength and flexural strength, and will also be excellent in structural stability at high temperatures. Moreover, it will be characterized by good flame resistance.

If the copolymers contain an unsaturated carboxylic acid as one of the copolymerized components, the complex-forming reaction between the metallic compound and the copolymer can be effected under relatively mild conditions without decomposition or other difficulties. The thus-obtained metal-containing products will be characterized by excellent mechanical properties, including excellent tensile, flexural and impact strengths, and moreover, its structural stability will not decrease at high temperatures, as compared with comparable materials formed with polyacrylonitrile. It is believed that this excellence in properties is due to the fact that in a complex-forming reaction, the metallic ions are ionically captured by the carboxyl groups of the compolymers at an early stage of the reaction and the thus-produced ionic bonds are broken off during the subsequent heat treatment or heat compression molding stage, thereby effecting coordination bonding between the nitrile groups and metallic ions.

The unsaturated carboxylic compound used herein may be partially replaced with other copolymerizable monomers, such as the unsaturated aldehydes, including acrolein or methacrolein, the unsaturated halogenides, including vinyl chloride or vinylidene chloride, or vinyl acetate or styrene.

Suitable free-radical polymerization initiators used for forming the subject polymers, may include any conventional initiator used for this purpose, such as the peroxides, the diazo-compounds, the persulfates and the redox type catalysts.

As indicated above, in one of the embodiments of this invention, polymerization can be effected in a sol of a powdered inorganic material, in water, or a polar solvent whereby the inorganic material forms a colloid in the sol. Suitable such sols include those stable sols of powdered silica or alumina having a particle size of from 5 to 1,000 mμ, in a solvent such as water, methanol or other polar solvent.

As described before, the metal-containing, organic high molecular compounds of this invention consist of: (1) a copolymer prepared by copolymerizing acrylonitrile or methacrylonitrile with an unsaturated carboxylic compound, such as a carboxylic ester, amide, or acid, (2) coordination bonding a metallic compound to the nitrile groups of the copolymer in the form of a metallic ion or salt, and, if desired, (3) uniformly dispersing a powdered inorganic material in the copolymer.

The mechanism of the coordination bonding or complex-forming reaction, and the structure of the metal-containing, organic high molecular compounds are not completely understood at the present time. The compounds of this invention, however, were found to have a specific color tone depending upon the particular metal or metals and/or metal ion or ions contained in the copolymer, and these compounds are insoluble in boiling dimethylformamide. This surprisingly high thermal stability and greatly improved mechanical properties would indicate that these compounds are novel high molecular weight compounds which are different from any heretofore known.

It is believed that the metal-containing, organic high molecular compounds of this invention have the structure as shown below (number of coordination in this case being 4). (Refer to *Bull. Chem. Soc. Japan*, vol. 32, p. 741.)

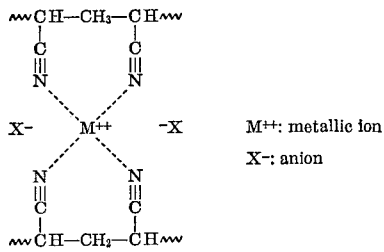

$M^{++}$: metallic ion
$X^-$: anion

The extent of intermolecular and intramolecular cross-linkings through the metallic salts or ions, will depend upon the number of these coordination bonds available for cross-linking. If a molar ratio of nitrile groups to metallic ions or salts to which the groups are coordination bonded is too large, the desirable improvements in heat resistance, as previously mentioned, will not be obtained. On the other hand, if this molar ratio is too small, the fluidity and consequent moldability will be affected; for example, an acrylonitrile-methacrylic acid copolymer containing 10% by weight of methacrylic acid coordination bonded with copper borate which has been compression molded at 200° C. and 500 kg./cm.$^2$ for 15 minutes to obtain molded articles, heated in air at 300° C. for 5 minutes to determine weight loss. Ten parts by weight of this article was immersed in 990 parts by weight of boiling dimethylformamide at 153° C. for 8 hours to determine the quantity of dissolvable material contained in the article. The articles where further tested for flexural strength and fractures were determined by observation using a scanning type electron microscope to determine the degree of adhesion between the copolymer particles and the metallic compound and the degree of fluidity. The results obtained from these tests are shown in Tables 1A and 1B.

ages, thereby rendering the compound unsatisfactory from the point of view of heat resistance, etc. On the other hand, if the molar ratios exceed this range, the compound will have too many cross-linkages so that moldability and fluidity will be adversely affected.

The metallic ions or salts contained in the metal-containing, high molecular compounds of this invention should be those which are capable of being coordination bonded to the nitrile groups contained in the same compounds. For this purpose, any ion or salt of a metal reacted from the group of 4th Period transition metals or Group II metals of the Periodic Table of Elements, may be used. For instance, suitable chemical compounds usable include the organic or inorganic acid salts of iron, cobalt, nickel, manganese, copper and zinc, and they may preferably be the chlorides, carbonates, borates, acetates and acetylacetonates of these metals. These compounds may be used either singly or in admixtures of two or more. Unlike the prior art compounds, alkali metal ions are useless in the practice of this invention because they form no coordination bond with the nitrile groups.

According to one aspect of this invention, the coordination bond-forming reaction between the nitrile group containing copolymer and at least one of the metallic compounds is effected by admixture in a ball mill, or the like, and then heating at a temperature of 150°–250° C. either during or following compression molding at a pressure of at least 50 kg./cm.$^2$. The use of pressures of less than 50 kg./cm.$^2$ will generally be insufficient to effect the reaction between the copolymer particles and the metallic compounds, due to insufficient contact, and will result in a product of low tensile, flexural and impact strengths.

During the heat treatment the metal-containing organic compound of this invention, which can occur either during or following compression molding, a coordination bond type cross-linking reaction takes place, with aid of the metallic compound, between the copolymer particles contacted with or melt adhered to each other, so that a firm molded article is obtained. If the treating temperature used in this step is less than 150° C., the coordination bond type cross-linking reaction will not completely occur so that the resulting product will be low in flexural strength and insufficient in high temperature structural stability. If this temperature is above 250° C., the copolymer will be thermally decomposed and/or oxidatively decomposed, thus also reducing the mechanical properties. For example, various moldings were obtained by incorporating samples of an acrylonitrile-methacrylic acid copolymer containing 10% by weight of methacrylic acid

TABLE 1A.—VARIATION OF EFFECT OF METAL WITH AMOUNT THEREOF USED

| Amount of copper borate (calculated as metal) (molar ratio of metal to nitrile group Cu/CN) | 0 | 1/128 | 1/64 | 1/32 | 1/8 |
|---|---|---|---|---|---|
| Amount of compound dissolved in boiling dimethylformamide (percent) | 98.1 | 43.9 | 9.2 | 0.81 | 0.32 |
| Weight loss (percent) (after heated in the air at 300° C. for 5 minutes) | 34.5 | 22.5 | 12.0 | 5.0 | 3.0 |
| Flexural strength (kg./cm.$^2$) | 1,250 | 1,210 | 1,270 | 1,130 | 1,070 |
| Fluidity | No interparticulate boundaries found; Good fluidity. | The same as left. | The same as left. | The same as left. | The same as left. |

TABLE 1B.—VARIATION OF EFFECT OF METAL WITH AMOUNT THEREOF USED

| Amount of copper borate (calculated as metal) (Cu/CN) | 1/4 | 1/1 | 1.5/1 | 2/1 |
|---|---|---|---|---|
| Amount of compound dissolved in boiling dimethylformamide (percent) | 0.23 | 0.24 | 0.18 | 0.20 |
| Weight loss (percent) (after heated in the air at 300° C. for 5 minutes) | 2.5 | 1.1 | 0.9 | 0.9 |
| Flexural strength (kg./cm.$^2$)† | 920 | 880 | 420 | 390 |
| Fluidity | Independent particles seen locally. | The same as left. | Very many independent particles seen and interparticulate boundaries clearly found. | The same as left. |

As can be seen from Tables 1A and 1B, the metal-containing, organic high molecular compound should have a molar ratio of 32:1 to 32:32 of the nitrile groups of the copolymer to the metallic ions or salts to obtain the desirable characteristics of this invention. If the molar ratios between the nitrile groups and the metallic ions or salts are below this range, the metal-containing compound will have fewer coordination bond type cross-linkwith copper borate in such amounts that one copper atom is present for every eight nitrile groups. This material was molded at different molding pressures and temperatures, respectively. The weight loss caused during the molding operations, which is an indication of decomposition, and the heat distortion temperatures and flexural strengths of the thus-obtained moldings are shown in Table 2.

TABLE 2.—EFFECT OF MOLDING PRESSURE AND TEMPERATURE

| | | | | | | | | | | | | | |
|---|---|---|---|---|---|---|---|---|---|---|---|---|---|
| Molding pressure (kg./cm.²) | 20 | 40 | 50 | 100 | 200 | 500 | 500 | 500 | 500 | 500 | 500 | 500 | 500 |
| Molding temperature (° C.) | 200 | 200 | 200 | 200 | 200 | 120 | 140 | 150 | 180 | 200 | 240 | 250 | 270 |
| Molding time (min.) | 60 | 60 | 60 | 20 | 20 | 120 | 120 | 120 | 30 | 15 | 5 | 5 | 5 |
| Weight loss during molded (percent)[a] | 1.1 | 1.4 | 1.0 | 0.8 | 1.8 | 0.4 | 0.3 | 1.0 | 1.6 | 2.0 | 3.2 | 4.9 | 47.0 |
| Heat distortion temp. (° C.) (ASTM D648, load 18.6 kg./cm.²) | 90 | 101 | 171 | 191 | 216 | 90 | 108 | 180 | 194 | 200 | 214 | 220 | [b] |
| Flexural strength (kg./cm.²) | 65 | 230 | 830 | 890 | 1,020 | 20 | 310 | 1,320 | 1,280 | 1,100 | 1,170 | 870 | [b] |

[a] $\dfrac{\text{Weight after molded}}{\text{Weight before molded}} \times 100\%$

[b] Impossible to measure because collapsed.

According to another aspect of this invention, the complex formation is achieved by dissolving the nitrile group-containing copolymer and the metallic compound in a common solvent, heating the solution at temperatures of 40°–140° C., treating the solution to remove the solvent therefrom to obtain a solid material and then heating the solid material at temperatures of 150°–250° C. either during or following compression molding at pressures of at least 50 kg./cm.². A wide variety of solvents may be used for this purpose. However, good results are attainable with dimethylformamide, dimethylacetomaide, dimethylsulfoxide, or an aqueous solution of potassium thiocyanide, sodium thiocyanide, calcium thiocyanide, ammonium thiocyanide, zinc chloride, ferric chloride, stannic chloride, or a zinc chloride-calcium chloride mixture.

Acording to still another aspect of this invention, the complex formation may also be achieved by suspending the nitrile group-containing copolymer in a solution of the metalic compound in water or other solvent, heating the suspension at temperatures of 40°–140° C., filtering the reaction mixture to collect a residue, drying the residue and then heating the dried residue to temperatures of 150°–250° C. during or following compression molding, at pressures of at least 50 kg./cm.².

In the latter two aspects of this invention, if the complex-forming reaction temperatures used are below 40° C., the reaction velocity will be significantly reduced thereby allowing the metallic ions to combine with the copolymer in sufficient proportions. On the other hand, if the temperatures used are above 140° C., a sufficiently secure interparticulate adhesion in the complex will not be obtained during compression molding, thereby yielding moldings having degraded mechanical properties. This effect is believed to be due to the large proportion of nitrile groups which are coordination bonded with the metallic ions at temperatures of above 140° C., so that cross-linking does not occur in the heating step.

The heat-resistance, modulus of elasticity, tensile strength and flexural strength of the metal-containing, organic high molecular compounds of this invention can be increased by the use of particulate or fibrous inorganic materials as reinforcing agents. For this purpose, it is desirable to use fine sized particles and to uniformly disperse these particles within the resinous matrix. The difference in thermal expansion coefficient between the matrix and the particulate filler should be small and the modulus of elasticity of the matrix should not be substantially smaller than that of the filler in order to increase the mutual adhesion of the matrix and the filler. By the use of such fillers, not only are the tensile, flexural and impact strengths of the compound improved, and modulus of elasticity but also self-lubricating, high wear-resistance and other properties are imparted to the product. Suitable fillers which may be used include particulate form aluminum, copper, iron, tin, zinc, lead, brass, bronze, graphite, silica, alumina, molybdenum disulfide, boron nitride, silicon carbide and glass beads; and fibrous form asbestos, carbon, glass, stainless steel and silicon carbide whiskers.

The use of powdered aluminum, copper, iron, tin, brass, bronze, lead, boron nitride, molybdenum disulfide or gaphite, or the fibrous stainless steel will improve the elasticity and high temperature structural stability and heat conductivity and will facilitate molding a subsequent heat treatment because of their high heat conductivities. The use of powdered molybdenum disulfide, graphite, boron nitride or the like as fillers will permit the production of a filler-reinforced compound which has excellent self-lubrication and wear-resistance properties.

The use of fibrous fillers will generally improve the thermal properties, and will remarkably improve impact strength.

The fillers may be incorporated into the metal-containing, organic high molecular compound by admixture in conventional apparatus such as a ball mill, V-type blender or like device, before molding. They may alternatively be incorporated into the metal-containing, organic high molecular compound by suspension and dispersion in the reactant solutions of the copolymer and the metallic compound, or the like.

The fibrous fillers, such as asbestos fibers, may be incorporated into the metal-containing organic compound by mixing an emulsion of the copolymer in water or a polar solvent (the emulsion of the copolymer being obtained by emulsion polymerization according to this invention) with a dispersion of inorganic fibers and metallic salts, such as aluminum chloride, aluminum acetate, aluminum formate, stannic chloride, zirconium chloride and zirconium acetate, in water or a polar solvent. The fibers and the copolymer particles are coprecipitated, thereby producing a copolymer in which the fine fibers are uniformly distributed therein. This copolymer is then reacted with the metallic salts to obtain an inorganic fillber-reinforced, metal-containing, organic high molecular compound in which the fibers are evenly dispersed.

The compounds of this invention may suitably be compression molded under heat, or transfer-, extrusion- or injection molded.

Although the basic intent of this invetntion is to provide a metal-containing copolymer which has excellent wear-resistance and excellent mechanical properties, the metal-containing organic compounds according to this invention can have other desirable properties as well, depending on the particular purpose for which they are intended to be used. More particularly, if they contain fine inorganic particles, such as powdered silica, they will be usable as structural materials for buildings, furniture and the like, while if they contain powdered metallic fillers, they will have excellent thermal stability, thermal conductivity, self-lubrication, wear-resistance and the like and will be usable for the production of bearings, gears, cams or other mechanical parts. In addition, if they contain asbestos or other fibers, they will be usable for insulating materials, brake linings, etc.

When the metal-containing organic compounds of this invention are prepared by using metal halides, such as the chlorides, bromides or iodides of copper, iron, cobalt, nickel, zinc or manganese; especially cuprous, cupric, zinc, ferrous or ferric chlorides, or cuprous or cupric bromides, as the metallic compound, the product may be foamed by heating to preferably 170°–250° C. after molding, thereby obtaining a foamed resin therefrom.

Having generally described the invention, a further understanding can be attained by reference to certain specific Examples which are provided herein for purposes of illustration only and are not intended to be limiting unless otherwise so specified.

EXAMPLE 1

Four hundred parts by weight of a degased deionized water, 85 parts by weight of acrylonitrile and 15 parts by weight of acrylic acid were introduced into a flask provided with a stirrer, cooler, thermometer and inlet for nitrogen and kept at a temperature of 40° C. while stirring. The resulting mixture was then treated with a solution of 0.3 parts by weight of potassium persulfate in 10 parts of a deionized water and, one minute thereafter, with a solution of 0.15 parts by weight of sodium bisulfite in 10 parts by weight of a deionized water to begin precipitation of a white product. Polymerization was completed three hours after the beginning of the precipitation. The white product so obtained was filtered off and dried at 60° C. under reduced pressure for 24 hours to obtain a yield of 98% by weight of an acrylonitrile-acrylic acid copolymer having a $\eta_{sp}$ of 0.45 as determined (25° C., 0.1% concentration) using dimethylformamide (hereinafter referred to as "DMF").

Eighty parts by weight of the copolymer thus obtained and 23.7 parts by weight of copper borate (this borate containing 42.8% by weight of copper and being prepared by firing a starting copper borate at 400° C. for two hours) were blended together in a ball mill for 16 hours, and the mixture was compression molded at 200° C. and 200 kg./cm.$^2$ for 15 minutes to obtain a brown-colored, plate-like molding which had a smooth and attractive surface and wherein the copper ions and the nitrile groups of the copolymer were contained in a molar ratio of 1:8.

Some of the moldings so obtained were boiled in DMF for 8 hours without substantial dissolution thereof, with the result of 0.21% in weight loss, and the remainder was heated to 300° C. in air for 4 hours with the result that their weight loss was 3.8%.

The heat distortion temperature (as determined from ASTM D648), tensile strength (ASTM D638), impact strength (ASTM D256), flexural strength (ASTM D790) and flexural modulus (ASTM D790) of said moldings are shown in Table 3.

EXAMPLE 2

A flask provided with a stirrer, cooler, thermometer and inlet for nitrogen, was charged with 85 parts by weight of acrylonitrile, 15 parts by weight of acrylic acid, 334 parts by weight of a sol of silica in methanol (the sol containing 100 parts by weight of silica of 10–20 m$\mu$ in particle size and produced by Nissan Chemical Co., Ltd., Japan), 3.3 parts by weight of a silane type binder (this binder being supplied by Shin-etsu Chemical Co., Ltd., Japan) and 400 parts by weight of an aqueous sulfuric acid solution adjusted to a pH of 3.0. The resulting mixed solution was kept at 30° C. while agitating and then 100 parts by weight of an aqueous solution (pH=0.3) of 0.5 parts by weight of potassium persulfate as the initiator and 0.5 parts by weight of sodium bisulfate was added thereto to start precipitation of a white product produced by the polymerization. Polymerization conttinued for three hours. The white product thus obtained was filtered off, washed and dried at 75° C. under reduced pressure for 24 hours to yield a white-colored, high molecular weight compound containing silicon dioxide (the yield being 197 parts by weight and the content of silicon dioxide being 50.1% by weight, as determined by an ash content test). One hundred and sixty parts by weight of the thus-obtained copolymer, containing the silicon dioxide, and 23.7 parts by weight of copper borate (this borate being prepared by firing copper borate at 400° C. for two hours thereby allowing the fired borate to contain 42.8% by weight of copper) were mixed together by use of a ball mill for 16 hours. The mixture was compression molded at 200° C. and 200 kg./cm.$^2$ for 15 minutes to obtain plate-like moldings which had brown, smooth and beautiful surfaces. The metallic ions and the nitrile groups were contained in a molar ratio of 1:8.

Some of the thus-obtained moldings were immersed in boiling DMF for 8 hours with the result that their weight loss was 0.14%. Some of the samples were then heated to 300° C. in air for 4 hours with the result that their weight loss was 1.1%.

The thermal and mechanical properties of said moldings are indicated in Table 3.

COMPARISON EXAMPLE 1

Using a ball mill, 53.1 parts by weight of polyacrylonitrile ($\eta_{sp.}$=0.24) prepared in about the same manner as in Example 1 and 18.5 parts by weight of copper borate previously treated in the same manner as in Example 1 were admixed over a period of 16 hours, and then compression molded at 200° C. and 200 kg./cm.$^2$ for 15 minutes to obtain plate-like moldings. The moldings were heated in boiling dimethylformamide. A decrease of 5.8% in weight was found.

These moldings had the thermal and mechanical properties as shown in Table 3.

TABLE 3

| Moldings tested | Example 1 | Example 2 | Comparison Example 1 |
|---|---|---|---|
| Heat distortion temp. (° C.) (ASTM D648, load 18.6 kg./cm.$^2$) | 210 | 270 | 180 |
| Tensile strength (kg./cm.$^2$) (ASTM D638) | 940 | 1,240 | 310 |
| Impact strength (kg.-cm./cm.$^2$) (ASTM D256, no notch) | 5.1 | 4.2 | 0.8 |
| Flexural strength (kg./cm.$^2$) (ASTM D790) | 1,400 | 1,370 | 490 |
| Flexural modulus (kg./cm.$^2$) (ASTM D790) | 40,000 | 170,000 | 42,000 |

As is apparent from Table 3, the moldings of Examples 1 and 2 are substantially superior in mechanical properties as compared to those of Comparison Example 1 which used polyacrylonitrile as the polymer.

EXAMPLE 3

The procedure of Example 1 was followed, except that the acrylic acid was substituted by acrylic methyl ester in varying amounts, to produce acrylonitrile-methyl acrylate copolymers, respectively, containing methyl acrylate in varying amounts. The copolymers so produced were each treated with copper borate as in Example 1 in such amounts that the copper ions and the nitrile groups of the copolymer were contained therein in a molar ratio of 1:8. The mixture was then compression molded at 200° C. and 200 kg./cm.$^2$ for 15 minutes to obtain plate-like moldings. The heat distortion temperature, tensile strength, impact strength and flexural strength of this material are shown in Table 4.

TABLE 4 (EXAMPLE 3)

| Content of methyl acrylate in copolymer (wt. percent) | 3 | 5 | 10 | 20 | 30 | 40 |
|---|---|---|---|---|---|---|
| $\eta_{sp.}$ of copolymer (DMF 0.1% solution, 250° C.) | 0.259 | 0.263 | 0.297 | 0.248 | 0.256 | 0.301 |
| Heat distortion temp. (° C.) (ASTM D648, load 18.6 kg./cm.$^2$) | 200 | 198 | 180 | 164 | 159 | 141 |
| Tensile strength (kg./cm.$^2$) (ASTM D638) | 470 | 430 | 830 | 1,010 | 910 | 880 |
| Impact strength (kg-cm./cm.$^2$) (ASTM D256, no notch) | 1.5 | 2.0 | 3.6 | 5.0 | 6.9 | 5.2 |
| Flexural strength (kg./cm.$^2$) (ASTM D790) | 610 | 770 | 1,250 | 1,660 | 1,590 | 1,600 |

EXAMPLE 4

The procedure of Example 1 was followed except that methacrylic acid was used instead of acrylic acid in varying amounts, acrylonitrile-methacrylic acid copolymers respectively containing methacrylic acid in different amounts were obtained. The copolymers so obtained were each treated with copper borate as in Example 1 in such amounts that the copper ions and the nitrile groups were present in a molar ratio of 1:8 in the copolymer. The whole mass was then compression molded at 200° C. and 200 kg./cm.² for 15 minutes to obtain moldings in the form of plates. The thermal and mechanical properties of the moldings are shown in Table 5.

TABLE 5 (EXAMPLE 4)

| Content of methacrylic acid in copolymer (wt. percent) | 3 | 5 | 10 | 20 | 30 | 40 |
|---|---|---|---|---|---|---|
| ηsp. of copolymer (DMF 0.1% solution, 25° C.) | 0.439 | 0.425 | 0.560 | 0.591 | (a) | (a) |
| Heat distortion temp. (° C.) (ASTM D648, load 18.6 kg./cm.²) | 217 | 209 | 205 | 181 | 182 | 171 |
| Tensile strength (kg./cm.²) (ASTM D638) | 520 | 610 | 790 | 1,230 | 1,070 | 680 |
| Impact strength (kg.-cm./cm.²) (ASTM D256, no notch) | 2.2 | 2.6 | 3.6 | 5.0 | 4.1 | 4.0 |
| Flexural strength (kg./cm.²) (ASTM D790) | 783 | 875 | 1,168 | 1,420 | 1,250 | 995 | a Partially insoluble.

EXAMPLE 5

The procedure of Example 1 was repeated, except that acrylic amide was used instead of acrylic acid, in varying amounts, to produce acrylonitrile-acrylic amide copolymers respectively containing acrylic amide in different amounts. The thus-produced copolymers were each treated with copper borate as in Example 1 in such amounts that the copper ions and the nitrile groups were contained in a molar ratio of 1:8 in the copolymer. The mixture was then compression molded at 200° C. and 200 kg./cm.² for 15 minutes thereby obtaining plate-like moldings. The heat distortion temperature, tensile strength, impact strength and flexural strength of these moldings are indicated in Table 6.

TABLE 6 (EXAMPLE 5)

| Content of acrylic acid amide in copolymer (wt. percent) | 3 | 5 | 10 | 20 | 30 | 40 |
|---|---|---|---|---|---|---|
| ηsp. of copolymer (DMF 0.1% solution, 25° C.) | 0.427 | 0.431 | 0.486 | 0.477 | (a) | (a) |
| Heat distortion temp. (° C.) (ASTM D648, load 18.6 kg./cm.²) | 201 | 207 | 204 | 211 | 220 | 229 |
| Tensile strength (kg./cm.²) (ASTM D638) | 594 | 710 | 732 | 1,040 | 1,380 | 1,420 |
| Impact strength (kg.-cm./cm.²) (ASTM D256, no notch) | 1.7 | 1.9 | 2.7 | 4.7 | 6.9 | 12.0 |
| Flexural strength (kg./cm.²) (ASTM D790) | 732 | 832 | 970 | 1,240 | 1,800 | 1,890 | a Insoluble.

EXAMPLE 6

The procedure of Example 1 was repeated, except that methyl acrylate and methacrylic acid were used instead of acrylic acid and methacrylic acid. Acrylonitrile-methyl acrylate-methacrylic acid terpolymers were produced. The terpolymers were each treated with copper borate as in Example 1 in such amounts that the copper ions and the nitrile groups were contained in a molar ratio of 1:8 in the total mass. The mixture was then compression molded at 200° C. and 200 kg./cm.² for 15 minutes to obtain moldings in a plate form. The thermal and mechanical properties of these moldings are shown in Table 7.

TABLE 7 (EXAMPLE 6)

| Content of methyl acrylate in terpolymer (wt. percent) | 5 | 10 | 20 | 10 | 20 | 30 |
|---|---|---|---|---|---|---|
| Content of methacrylic acid in terpolymer (wt. percent) | 10 | 10 | 10 | 20 | 20 | 20 |
| ηsp. of terpolymer | 0.570 | 0.536 | 0.636 | 0.568 | 0.717 | (a) |
| Heat distortion temp. (° C.) | 181 | 174 | 170 | 168 | 152 | 144 |
| Tensile strength (kg./cm.²) | 680 | 710 | 1,120 | 1,090 | 920 | 930 |
| Impact strength (kg.-cm./cm.²) | 3.6 | 4.3 | 8.3 | 7.8 | 9.3 | 8.0 |
| Flexural strength (kg./cm.²) | 1,010 | 1,060 | 1,570 | 1,440 | 1,520 | 1,430 | a Insoluble.

EXAMPLE 7

The procedure of Example 1 was repeated, except that various comonomers were used instead of acrylic acid comonomers. These copolymers were then treated with copper borate as in Example 1 in such amounts that the copper ions and the nitrile groups were contained in a molar ratio of 1:8 in the total mass. The mixture was compression molded at 200° C. and 200 kg./cm.² for 15 minutes to obtain plate-like moldings whose thermal and mechanical properties are shown in Table 8.

TABLE 8 (EXAMPLE 7)

| Comonomer | Ethyl acrylate | n-Butyl acrylate | Isobutyl acrylate | Methyl methacrylate | Dimethyl itaconate | Dimethyl maleate | Diacetone-acrylic amide | Itaconic acid | Maleic acid |
|---|---|---|---|---|---|---|---|---|---|
| Content of comonomer (wt. percent) | 15 | 10 | 10 | 15 | 10 | 10 | 20 | 15 | 15 |
| Heat distortion temp. (° C.) | 163 | 157 | 151 | 181 | 166 | 155 | 187 | 190 | 194 |
| Tensile strength (kg./cm.²) | 570 | 520 | 605 | 490 | 660 | 580 | 1,020 | 690 | 700 |
| Impact strength (kg.-cm./cm.²) | 3.0 | 2.7 | 2.9 | 2.1 | 3.3 | 2.6 | 4.8 | 1.6 | 2.0 |
| Flexural strength (kg./cm.²) | 730 | 690 | 770 | 670 | 810 | 740 | 1,250 | 920 | 880 |

EXAMPLE 8

The procedure of Example 1 was repeated to produce acrylonitrile - methyl acrylate, acrylonitrile - methacrylic acid, and arcrylonitrile-acrylic amide copolymers. Each of these copolymers were treated with copper borate as in Example 1. These mixtures were compression molded at 200° C. and 200 kg./cm.² for 15 minutes to obtain corresponding plate-like moldings. The heat distortion temperature, tensile strength, impact strength and flexural strength of these moldings are shown in Table 9.

TABLE 9 (EXAMPLE 8)

| Comonomer | (Comparison example) Methyl acrylate | Methyl acrylate | Methyl acrylate | (Comparison example) Methacrylic acid | Methacrylic acid | Methacrylic acid |
|---|---|---|---|---|---|---|
| Content of comonomer (wt. percent) | 20 | 20 | 20 | 20 | 20 | 20 |
| Amount of copper borate added, calculated as copper (Molar ratio of copper to nitrile group Cu/CN) | 0 | 1/32 | 1/1 | 0 | 1/32 | 1/4 |
| Heat distortion temp. (° C.) | 75 | 130 | 171 | 81 | 148 | 192 |
| Tensile strength (kg./cm.²) | 1,220 | 1,290 | 710 | 920 | 970 | 1,000 |
| Impact strength (kg.-cm./cm.²) | 7.0 | 5.8 | 3.0 | 5.0 | 5.2 | 4.8 |
| Flexural strength (kg./cm.²) | 1,720 | 1,840 | 1,320 | 1,380 | 1,410 | 1,430 |

| Comonomer | Methacrylic acid | (Comparison example) acrylic amide | Acrylic amide | Acrylic amide | Acrylic amide | Acrylic amide |
|---|---|---|---|---|---|---|
| Content of comonomer (wt. percent) | 20 | 40 | 40 | 40 | 40 | 40 |
| Amount of copper borate added, calculated as copper (Molar ratio of copper to nitrile group Cu/CN) | 1/1 | 0 | 1/32 | 1/16 | 1/4 | 1/1 |
| Heat distortion temp. (° C.) | 190 | 120 | 199 | 201 | 230 | 216 |
| Tensile strength (kg./cm.²) | 820 | 810 | 1,260 | 1,330 | 1,370 | 1,300 |
| Impact strength (kg.-cm./cm.²) | 3.1 | 4.1 | 8.0 | 10.0 | 13.8 | 10.6 |
| Flexural strength (kg./cm.²) | 1,200 | 1,240 | 1,800 | 1,820 | 1,880 | 1,710 |

EXAMPLE 9

Acrylonitrile-acrylic acid copolymers containing 15% by weight of acrylic acid, prepared as in Example 1, were treated with zinc borate, manganese borate, cobalt borate, nickel carbonate and iron carbonate, which were prepared by treating the corresponding reagents in the same manner as in Example 1. The molar ratio of metal to nitrile groups was 1:4 in the copolymer. The additive incorporated copolymers were compression molded at 200° C. and 200 kg./cm.² for 15 minutes to obtain the corresponding plate-like moldings. The heat distortion temperature, tensile strength, impact strength and flexural strength of these moldings is shown in Table 10.

TABLE 10 (EXAMPLE 9)

| | Metallic salt added | | | | | |
|---|---|---|---|---|---|---|
| | Zinc borate | Manganese borate | Cobalt borate | Nickel carbonate | Iron corbonate | Cuprous chloride |
| Heat distortion temp. (° C.) | 190 | 165 | 159 | 171 | 160 | 192 |
| Tensile strength (kg./cm.²) | 990 | 700 | 770 | 620 | 640 | 570 |
| Impact strength (kg.-cm./cm.²) | 5.1 | 4.3 | 4.9 | 3.7 | 4.5 | 2.9 |
| Flexural strength (kg./cm.²) | 1,460 | 1,100 | 1,160 | 1,030 | 1,110 | 900 |

EXAMPLE 10

A methacrylonitrile-methacrylic acid copolymer containing 10% by weight of methacrylic acid, prepared in the same manner as in Example 1, was treated with copper borate, which was previously treated as in Example 1 in such an amount that the copper and the nitrile groups in a molar ratio of 1:8 in the copolymer. The mixture was then compression molded at 220° C. and 350 kg./cm.² for 30 minutes to obtain a plate-like molding which had the following thermal and mechanical properties:

Heat distortion temperature (° C.) ............. 131
Tensile strength (kg./cm.²) ................... 620
Impact strength (kg.-cm./cm.²) ................ 3.4
Flexural strength (kg./cm.²) .................. 720

EXAMPLE 11

An acrylonitrile-methacrylic acid copolymer, an acrylonitrile-methyl acrylate copolymer, and an acrylonitrile-acrylic amide copolymer, each containing fine silicon dioxide prepared as in Example 2, were treated with copper borate, which was pre-treated as in Example 1, in various molar ratios of copper to nitrile groups in the copolymers. The thus-obtained mixtures were compression molded under the same conditions as in Example 2 to obtain the corresponding plate-like moldings. The heat distortion temperature, flexural strength, and weight loss after heating to 300° C. in air for 4 hours, are shown in Table 11.

EXAMPLE 12

Fifty-nine parts by weight of an acrylonitrile-methacrylic acid copolymer containing 10% by weight of methacrylic acid was prepared as in Example 1, except for the use of methacrylic acid instead of the acrylic acid and having a $\eta_{sp.}$ of 0.491, were dissolved in 1,120 parts by weight of DMF. The solution so obtained was treated with 25.0 parts by weight of copper acetate to dissolve the acetate therein in order to form a mixed solution which was then heated to 130° C. under agitation, to form a deep blue color. 8 minutes later, after being allowed to form a gel-like material, it was heated to 40° C. under a reduced pressure of $10^{-2}$ mm. Hg for 48 hours to obtain a dried matter thereof which was then pulverized to yield a black-colored, powdery product. The copper ions to the nitrile groups of the copolymer were contained in a molar ratio of 1:8. This product was compression molded at 190° C. and 500 kg./cm.² for 30 minutes to obtain plate-like moldings having the same luster as metallic copper.

Some of the moldings so obtained were immersed for 8 hours in boiling DMF and found to be difficult to dissolve. The result of a weight loss tests was 1.03%. The remainder was heated to 300° C. in air for 4 hours with the result of a weight loss of 3.8%.

These moldings had a flexural strength of 570 kg./cm.².

EXAMPLE 13

In 1,120 parts by weight of DMF were dissolved 59.0 parts by weight of an acrylonitrile-methacrylic acid copolymer containing 10 parts by weight of methacrylic acid. The copolymer was the same as used in Example 12. The solution so obtained was incorporated with 29.7 g. of copper acetylacetonate to dissolve the additive therein in order to form a mixed solution which was then heated to 140° C. under agitation. A gel-like material was produced 17 minutes after the start of the heating. The thus-produced gel-like material was dried at 40° C., under a reduced pressure of $10^{-2}$ mm. Hg, for 72 hours to obtain a solid matter which was then pulverized into a black powdery product. The copper ion to nitrile troup to the copolymer was in a molar ratio of 1:8. The product so obtained was compression molded at 190° C. and

TABLE 11 (EXAMPLE 11)

| Comonomer | (Comparison example) Methacrylic acid | Methacrylic acid | Methacrylic acid | (Comparison example) Methacrylic acid | (Comparison example) Methacrylic acid | Methacrylic acid | Methacrylic acid |
|---|---|---|---|---|---|---|---|
| Content of comonomer (wt. percent) | 20 | 20 | 20 | 20 | 20 | 20 | 20 |
| Amount of silicon dioxide contained (wt. percent) (silicon dioxide/copolymer plus silicon dioxide) | 20 | 20 | 20 | 70 | 70 | 70 | 70 |
| Amount of copper borate (Cu/CN) | 0 | 1/16 | 1/4 | 0 | 0 | 1/32 | 1/8 |
| Molding pressure (kg./cm.²) | 500 | 500 | 500 | 800 | 800 | 800 | 800 |
| Molding temperature (° C.) | 200 | 200 | 200 | 200 | 200 | 200 | 200 |
| Molding time (min.) | 15 | 15 | 15 | 30 | 30 | 30 | 30 |
| Weight loss (percent) (300° C., 4 hours) | 21.6 | 3.1 | 1.9 | 6.9 | 3.8 | 2.0 | 1.8 |
| Heat distortion temp. (° C.) | 118 | 207 | 230 | 129 | 199 | 226 | 276 |
| Flexural strength (kg./cm.²) | 1,410 | 1,360 | 1,150 | 1,220 | 710 | 1,240 | 1,100 |

| Comonomer | Methacrylic acid | Methacrylic acid | Methacrylic acid | (Comparison example) Methyl acrylate | Methyl acrylate | (Comparison example) Acrylic amide | Acrylic amide | Acrylic amide |
|---|---|---|---|---|---|---|---|---|
| Content of comonomer (wt. percent) | 20 | 20 | 20 | 20 | 20 | 40 | 40 | 40 |
| Silicon dioxide contained (wt. percent) | 70 | 70 | 70 | 50 | 50 | 50 | 50 | 50 |
| Amount of copper borate added (Cu/CN) | 1/8 | 1/4 | 1/1 | 0 | 1/8 | 0 | 1/32 | 1/4 |
| Molding pressure (kg./cm.²) | 800 | 800 | 800 | 500 | 500 | 500 | 500 | 500 |
| Molding temperature (° C.) | 240 | 200 | 200 | 200 | 200 | 180 | 180 | 180 |
| Molding time (min.) | 30 | 30 | 30 | 15 | 15 | 15 | 15 | 15 |
| Weight loss (percent) (300° C., 4 hours) | 1.2 | 1.8 | 0.9 | 8.6 | 2.1 | 7.5 | 2.6 | 1.6 |
| Heat distortion temp. (° C.) | 303 | 298 | 310 | 131 | 230 | 131 | 239 | 299 |
| Flexural strength (kg./cm.²) | 980 | 1,140 | 1,070 | 1,470 | 1,330 | 1,240 | 1,870 | 1,730 |

560 kg./cm.² for 30 minutes to plate-like moldings having a luster similar to that of metallic copper.

Some of these moldings were boiled in DMF for 8 hours without substantial dissolution, with the result of their weight loss being 1.6%. while the remainder was heated to 300° C. in air with the result that they decreased in weight by 4.1%. In addition, the moldings had a flexural strength of 540 kg./cm.².

EXAMPLE 14

Two hundred parts by weight of a degased deionized water, 8.0 parts by weight of cupric chloride and 0.82 parts by weight of hydroxylamine hydrochloride were charged into a flask provided with an agitator, a cooler, thermometer and inlet for nitrogen. The mixture was kept at 45° C. under agitation to obtain a solution thereof. This solution was treated with 10.0 parts by weight of a powdered acrylonitrile-acrylic acid copolymer containing 20% by weight of acrylic acid as in Example 1 and having a $\eta_{sp.}$ of 0.487, to suspend the powdered copolymer in the solution. The suspension was agitated at 45° C. for 90 minutes and filtered to obtain a residue which was washed twice with a deionized water and dried at a temperature of 20° C. and a reduced pressure of $10^{-3}$ mm. Hg for 16 hours thereby obtaining a light-yellow dried material. The ratio of copper ions to nitrile groups of the copolymer was a molar ratio of 1:29.4.

The dried material thus obtained was compression molded at 180° C. and 350 kg./cm.² for 5 minutes to obtain brown plate-like moldings having a smooth surface.

The thermal and mechanical properties of these moldings are as follows:

| | |
|---|---|
| Heat distortion temp. (° C.) | 170 |
| Tensile strength (kg./cm.²) | 1310 |
| Impact strength (kg.-cm./cm.²) | 4.8 |
| Flexural strength (kg./cm.²) | 1490 |
| Flexural modulus (kg./cm.²) | 37,000 |

EXAMPLE 15

Twenty parts by weight of a copolymer composition consisting of 40% by weight of acrylonitrile, 10% by weight of methacrylic acid and 50% by weight of silicon dioxide as a filler, prepared as in Example 2, were suspended and dispersed in a solution of 11.7 parts by weight of copper sulfate and 0.96 parts by weight of hydroxylamine sulfate in 200 parts by weight of a deionized water. The suspension so obtained was agitated at 95° C. for 180 minutes, filtered off, washed and dried to yield a light-brown material wherein the copper ions and the nitrile groups of the copolymer were contained in a molar ratio of 1:18.6.

The material obtained was compression molded at 200° C. and 500 kg./cm.² for 5 minutes to obtain black-brown plate-like moldings having a smooth surface.

The moldings had the following thermal and mechanical properties:

| | |
|---|---|
| Heat distortion temp. (° C.) | 258 |
| Tensile strength (kg./cm.²) | 1110 |
| Impact strength (kg.-cm./cm.²) | 3.3 |
| Flexural strength (kg./cm.²) | 1260 |
| Flexural modulus (kg./cm.²) | 150,000 |

EXAMPLE 16

A flask provided with a stirrer, cooler, thermometer and inlet for nitrogen was charged with, by weight, 200 parts of a deionized water, 70 parts of acrylonitrile, 30 parts of methyl acrylate, 0.4 parts of ethyl mercaptan, as a chain transfer agent, and 2.0 parts of Pelex-OTP (composed of sodium dialkylsulfosuccinate and supplied by Kaoh Atlas Co., Ltd.) were kept at 70° C. under agitation. The mixture was then treated with 0.1 part of potassium persulfate as an initiator and agitated for an additional 90 minutes to yield a white-turbid emulsion of acrylonitrile-methylacrylate copolymer. Separately, 42.0 parts by weight of Crysotile asbestos fibers, a filler for resinous material (the fibers being supplied by Nippon Asbestos Co., Ltd.) were introduced into 8,000 parts by weight of a deionized water, agitated and dispersed by a homogenizing mixer rotating at about 8,000 r.p.m., and incorporated with 2.6 parts by weight of anhydrous aluminum chloride as a dispersant. It was then allowed to stand for 12 hours. The copolymer emulsion and the asbestos fibers dispersion each were mutually mixed, agitated and then allowed to stand for 8 hours to obtain a precipitate which was then dried at 70° C. for 24 hours. An acrylonitrile-methyl acrylate copolymer (containing methyl acrylate in an amount of 30% by weight of the original, fiber-free copolymer) was obtained, wherein the asbestos fibers were uniformly dispersed in an amount of 30% by weight of the fiber-containing copolymer.

Following the procedure of Example 14, 14.3 parts by weight of the fiber-containing copolymer thus obtained were suspended and dispersed in a solution of 11.3 parts by weight of copper nitrate and 0.82 parts by weight of hydroxylamine hydrochloride in 200 parts by weight of a deionized water. The suspension so produced was agitated at 95° C. for 180 minutes, filtered, washed and dried to a light-brown material wherein the copper ions and the nitrile groups of the copolymer were present in a molar ratio of 1:16.9.

This material was compression molded at 200° C. and 500 kg./cm.² for 7 minutes to obtain brown moldings, in the plate form, having a smooth surface.

The thermal and mechanical properties of these moldings are as follows:

| | |
|---|---|
| Heat distortion temp. (° C.) | 196 |
| Tensile strength (kg./cm.²) | 1070 |
| Impact strength (kg.-cm./cm.²) | 16.9 |
| Flexural strength (kg./cm.²) | 1440 |

EXAMPLE 17

An asbestos fiber-containing acrylonitrile-methacrylic acid copolymer in dry state (containing methacrylic acid in an amount of 30% by weight of the original, fiber-free copolymer) wherein asbestos fibers were contained in an amount of 30% by weight of the fiber-containing copolymer, was prepared. This copolymer was prepared as in Example 16, and 18.5 parts by weight of copper borate containing 42.8% by weight of copper, was admixed therewith in a ball mill for 16 hours to form a mixture which was then compression molded at 200° C. and 500 kg./cm.² for 30 minutes thereby obtaining brown plate-like moldings having a smooth surface. The moldings had the following thermal and mechanical properties:

| | |
|---|---|
| Heat distortion temp. (° C.) | 202 |
| Impact strength (kg.-cm./cm.²) | 14.0 |
| Flexural strength (kg./cm.²) | 1590 |

EXAMPLE 18

A mixture of 66.4 parts by weight of an acrylonitrile-acrylic acid copolymer containing 20% by weight of acrylic acid, produced as in Example 1, was prepared with 18.5 parts by weight of copper borate containing 42.8% by weight. Samples of the thus-prepared mixture were respectively blended with fillers, powdered copper (powdered electrolytic copper CE20 supplied by Fukuda Metallic Foil & Powder Co., Ltd.), powdered aluminum (powdered sprayed aluminum AL-AT-150 supplied by the same company as above), powdered iron (powdered electrolytic iron Fe-(E)-150 supplied by the same company as above), powdered graphite and powdered silicon carbide (having a 300-mesh size) by use of a ball mill for 16 hours. The filler-blended samples were compression molded at 150° C. and 800 kg./cm.² for 5 minutes and then thermally treated at 190° C. in an atmosphere of nitrogen for 20 minutes. The plate-like moldings having the thermal and mechanical properties are shown in Table 12.

TABLE 12 (EXAMPLE 18)

| | Filler | | | | |
|---|---|---|---|---|---|
| | Powdered aluminum | Powdered copper | Powdered iron | Powdered graphite | Powdered silicon carbide |
| Amount of filler added (part by weight) (based on 66.4 parts by weight of co-polymer) | 76.3 | 252 | 222 | 63.5 | 90.0 |
| Heat distortion temp. (° C.) | 290 | 293 | 289 | 270 | 274 |
| Impact strength (kg.-cm./cm.²) | 5.3 | 6.7 | 3.1 | 3.3 | 2.0 |
| Flexural strength (kg./cm.²) | 1,500 | 1,480 | 1,210 | 1,100 | 830 |
| Flexural modulus | 86,000 | 92,000 | 150,000 | 140,000 | 170,000 |

Having now fully described the invention, it will be apparent to one of ordinary skill in the art that many changes and modifications can be made thereto without departing from the spirit or scope of the invention.

Accordingly, what is claimed as new and intended to be secured by Letters Patent is:

1. A metal-containing, organic high molecular compound which comprises: a copolymer of 45–97% by weight of at least one member selected from the group consisting of acrylonitrile and methacrylonitrile, with 55–3% by weight of at least one unsaturated carboxylic compound selected from the group consisting of unsaturated carboxylic ester, unsaturated carboxylic acid, unsaturated carboxylic acid amide, and mixtures thereof, which is stabilized through cross-linking with at least one metallic compound of a transition metal of the 4th Period of the Periodic Table, or a metal of Group II of the Periodic Table or mixtures thereof, said metal in ion or salt form being coordination bonded with the nitrile groups of the copolymer in molar ratios of from 1:32 to 32:32.

2. The metal-containing, organic high molecular compound according to Claim 1, wherein the unsaturated carboxylic compound is selected from the group consisting of methyl, ethyl, n-butyl and isobutyl esters of acrylic, methacrylic, itaconic and maleic acids; acrylic, methacrylic, itaconic and maleic acids; and acrylic, methacrylic, diacetoneacrylic, N-methylolacrylic and N-methylolmethacrylic amides.

3. The metal-containing, organic high molecular compound according to Claim 1, wherein the unsaturated pound is a compound of iron, cobalt, nickel, chromium, manganese, copper, or zinc.

4. A process for the preparation of a metal-containing, organic high molecular compound, characterized by reacting a copolymer of 45–97% by weight of at least one member selected from the group consisting of acrylonitrile and methacrylonitrile, with 55–3% by weight of at least one unsaturated carboxylic compound selected from the group consisting of unsaturated carboxylic ester, unsaturated carboxylic acid, unsaturated carboxylic amide and mixtures thereof, with at least one metallic compound of a transition metal of the 4th Period of the Periodic Table, or a metal of Group II of the Periodic Table or mixtures thereof, in such amounts that the metal in ion or salt form is coordination bonded with the nitrile groups of the copolymer in molar ratios of from 1:32 to 32:32 which coordination stabilizes said co-polymer by a cross-linking mechanism.

5. The process according to Claim 4, wherein the reaction is effected while heating the copolymer and metallic compound to a temperature of 150°–250° C. after compression molding at pressures of at least 50 kg./cm.².

6. The process according to Claim 4, wherein the reaction is effected while heating the copolymer and metallic compound to a temperature of 150°–250° C. during compression molding at pressures of at least 50 kg./cm.².

7. The process according to Claim 4, wherein said copolymer is reacted with the metallic compound at a temperature of from 40°–140° C. which is then molded.

References Cited

UNITED STATES PATENTS

| 2,356,767 | 8/1944 | Kropa | 260—85.5 |
| 2,425,191 | 8/1947 | Kropa | 260—85.5 ES |
| 2,648,647 | 8/1953 | Stanton | 260—85.5 ES |
| 3,717,603 | 2/1973 | Matsumura | 260—85.5 ES |
| 3,056,169 | 10/1962 | Hendricks | 260—41 B |

MORRIS LIEBMAN, Primary Examiner

P. R. MICHL, Assistant Examiner

U.S. Cl. X.R.

260—42.17, 42.18, 42.22, 42.28, 42.29, 85.5 M, 898